Nov. 17, 1953

N. L. COBB 2,659,158

MACHINE FOR TESTING CHARACTERISTICS OF
GEAR CUTTERS, GEARS, AND THE LIKE

Filed May 28, 1946

Inventor
Neal L. Cobb
by Wright, Brown,
Dunby & Gray
Attys.

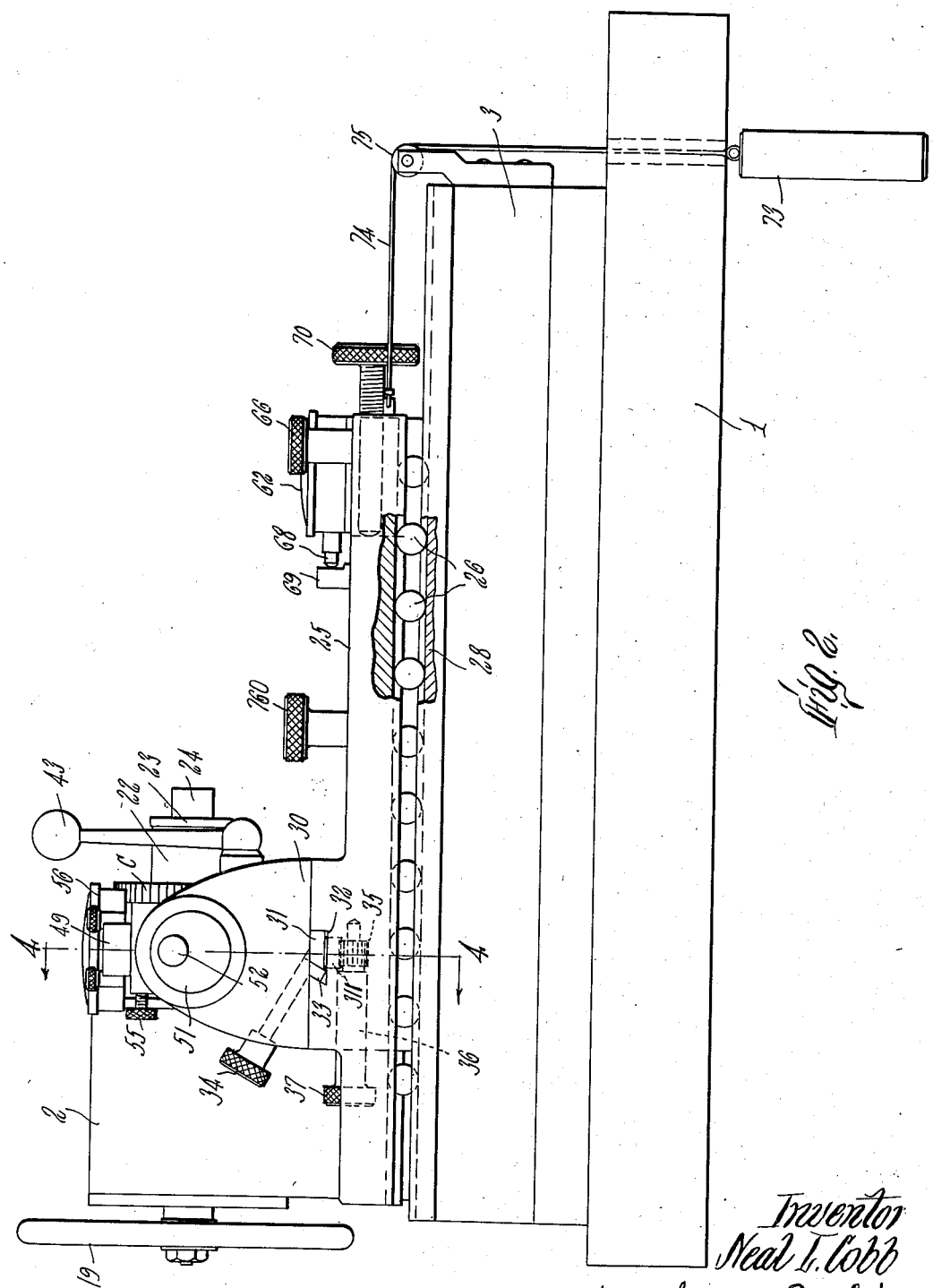

Nov. 17, 1953
N. L. COBB
2,659,158
MACHINE FOR TESTING CHARACTERISTICS OF
GEAR CUTTERS, GEARS, AND THE LIKE
Filed May 28, 1946
4 Sheets-Sheet 3
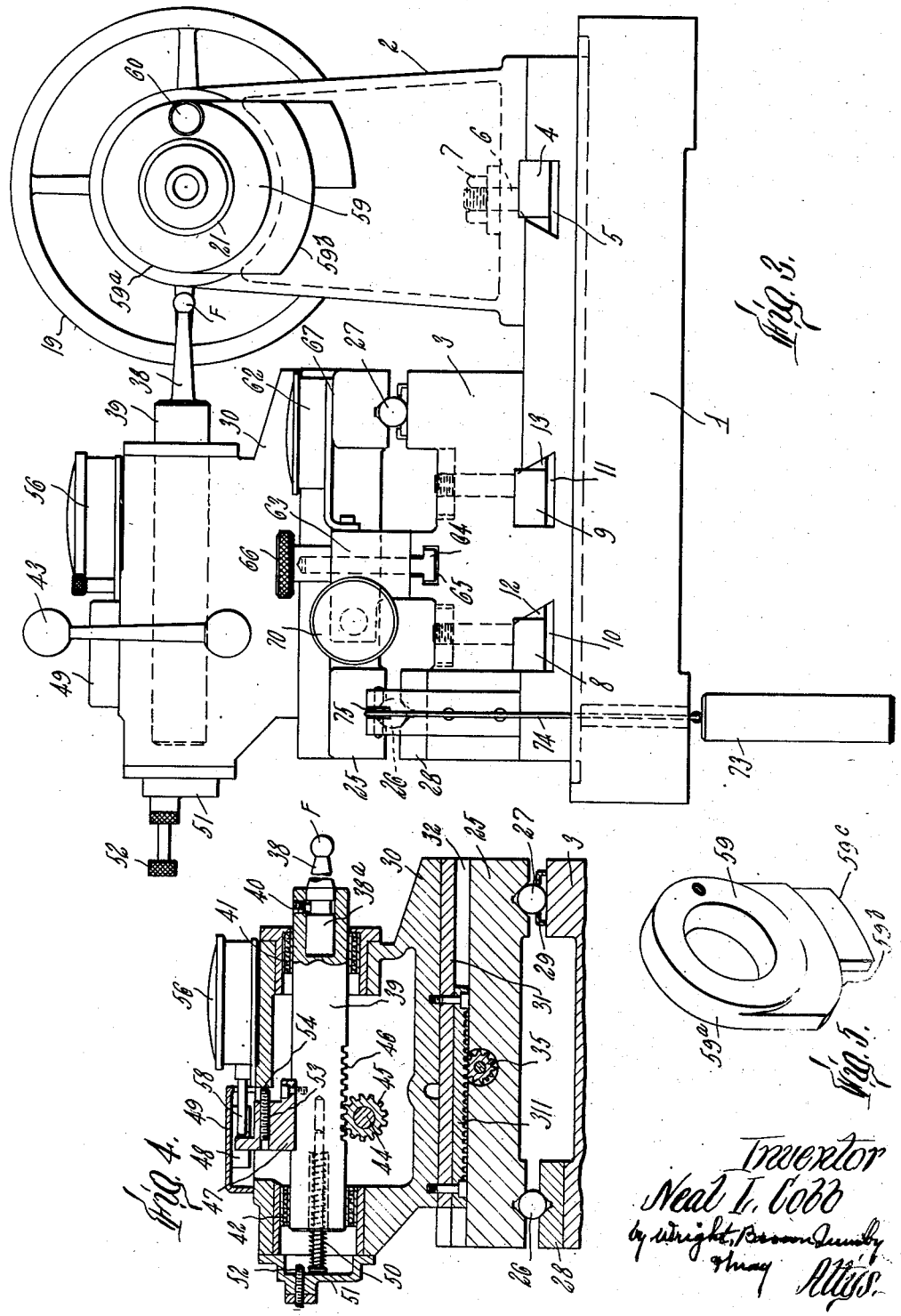
Inventor
Neal L. Cobb
by Wright, Brown, Quinby
 & May
Attys.

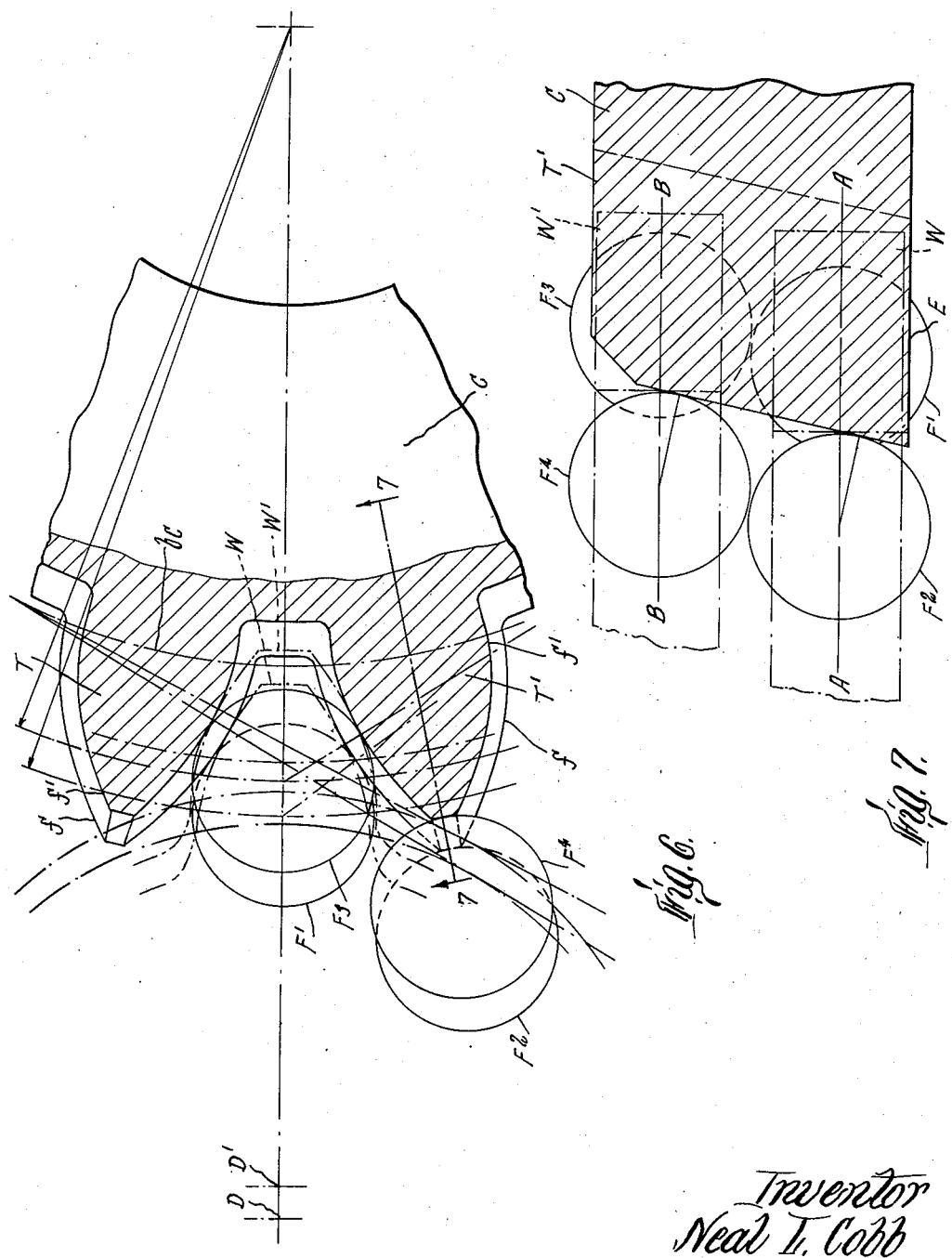

Patented Nov. 17, 1953

2,659,158

UNITED STATES PATENT OFFICE 2,659,158

MACHINE FOR TESTING CHARACTERISTICS OF GEAR CUTTERS, GEARS, AND THE LIKE

Neal L. Cobb, Springfield, Vt., assignor to The Fellows Gear Shaper Company, Springfield, Vt., a corporation of Vermont Application May 28, 1946, Serial No. 672,827

4 Claims. (Cl. 33—179.5)

The present invention relates to measuring and testing apparatus. Its object is to furnish means by which the external diameters and tooth proportions of gears, gear shaper cutters, and other toothed articles may be measured and their accuracy tested and, in the case of cutters having clearances on the sides of their teeth, the accuracy and values of the clearance angles may likewise be tested and measured. In its physical embodiment, the invention comprises means for supporting test pieces of the character above stated, means for supporting a contact member and placing such member in contact with the test piece at different points on the surfaces thereof where determinations need to be made, and means for measuring and indicating the positions of the contact member with respect to datum points and positions whereby the values needed in respect to such test pieces can be made known.

An illustrative machine embodying the principles of this invention and diagrams illustrating its use are described in the following specification and shown in the accompanying drawings.

In the drawings,

Fig. 2 is a side elevation of the machine with a part thereof broken away and shown in section;

Fig. 3 is an end elevation of the machine as seen from the right of Figs. 1 and 2;

Fig. 4 is a sectional view taken on line 4—4 of Fig. 2; showing the interior parts of the holder for the contact element;

Fig. 5 is a perspective view of a gauge constituting a part of the means by which datum positions of the contact element are established;

Fig. 6 is a diagrammatic sectional view of a gear shaper cutter and contact element, to illustrate the nature of the determinations made by the use of this apparatus;

Fig. 7 is a sectional view taken on line 7—7 of Fig. 6.

Like reference characters designate the same parts wherever they occur in all the figures.

Figure 1:
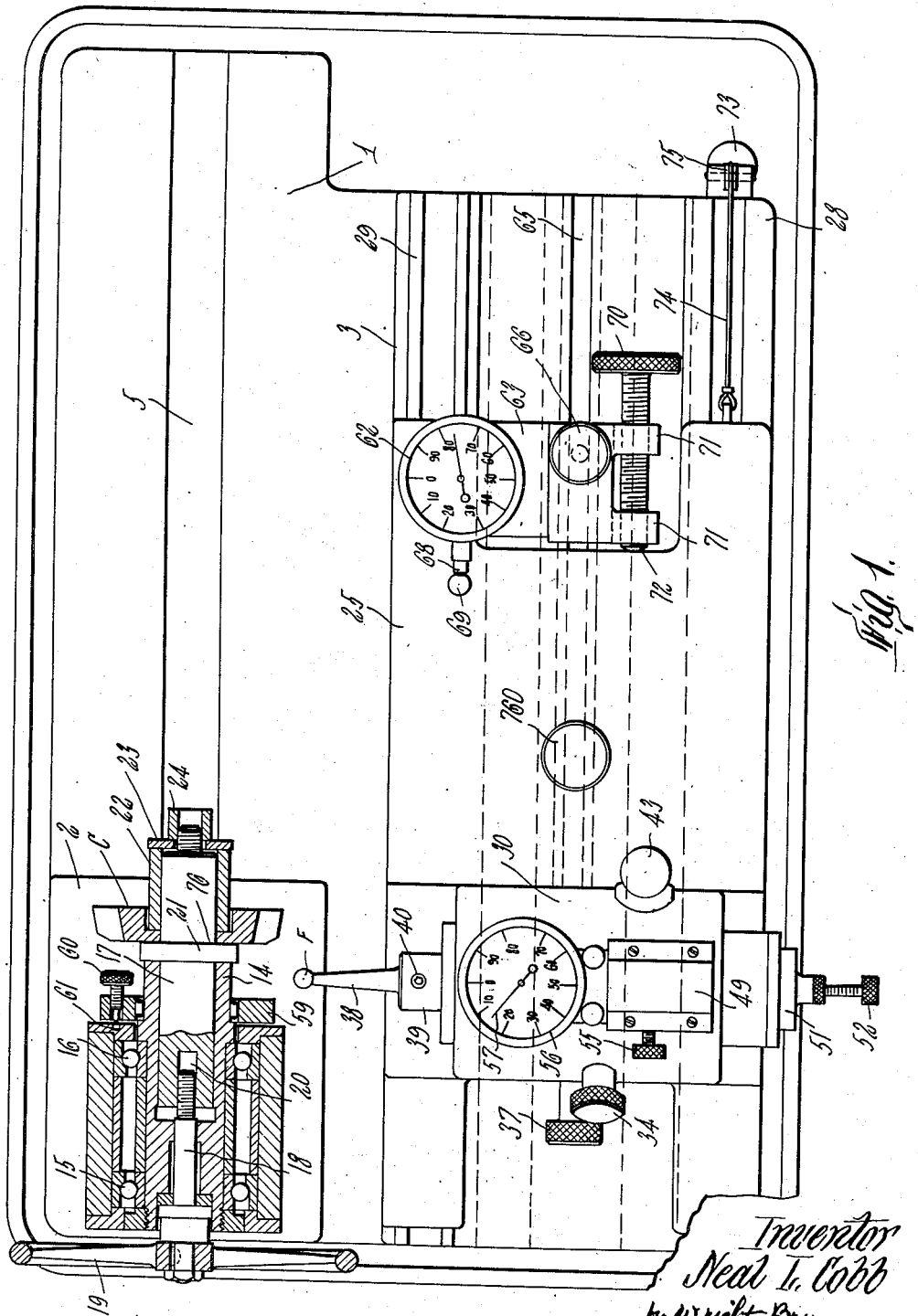
Fig. 1 is a plan view of the machine embodiment referred to, showing the holder for the test piece, and a test piece mounted thereon, in section.

Without intending to limit the generality of the invention, I will describe its use for measuring, and checking the accuracy of, certain characteristics of a cutter designed for generating involute gears by molding generating process, with reference to Figs. 6 and 7. In these figures, T and T' show on an enlarged scale two adjacent teeth of a gear shaper cutter C. The dotted outlines designated W and W' indicate the positions of a gear tooth generated by the said cutter teeth at different stages in the course of the operative life of the cutter.

Cutters of the type indicated have teeth which are similar to gear teeth in that they have side faces of involute curvature, but they differ from gears by being made with side clearances so that their involute faces are helicoids and their outer faces are segments of a conical surface. The cutting edges of such teeth are located at the ends of the teeth in the plane designated by the line E in Fig. 7, or approximately in such a plane, in the case of spur type cutters, when the cutter is new. The plane so indicated is perpendicular to the axis of the cutter. When the cutting edges become dull, they are sharpened by grinding away the ends of the teeth so that the new edges lie in planes which are located progressively further away from the plane E and also are perpendicular to the axis of the cutter. The lines A—A and B—B indicate two of the planes in which the cutting edges may lie after repeated sharpenings. The intersections of all such planes with the tooth faces, however, are involute curves of the same base circle $bc$ (Fig. 6). The tooth curves at the intersections of the planes A—A and B—B are indicated by $f$ and $f'$ respectively in Fig. 6. Due to the recession of the cutting edges in this manner, gears of a given diameter must be placed at less center distances from the cutter after sharpening in order that the generated teeth shall have the same form and dimensions. Thus in Fig. 6, W is the tooth and the point D is the center of a given gear cut by edges located in a plane A—A; and W' is the tooth and D' the center of a like gear cut when the edges of the cutter are located in the plane B—B. When the cutter is made with the correct clearance angle at the sides of the teeth, and the correct taper or face angle at the outside circumference, all gears generated by the cutter after repeated grindings and correct adjustment of center distance have correct tooth forms and dimensions. One purpose of this invention is to determine whether or not cutters are so correctly made, by measuring the locations of points on the surfaces of the teeth and comparing such measurements with the values which are known to be correct.

A part of the equipment for making the measurements and tests required for this purpose is a contact member of hard, unyielding, and wear resistant material, such as tungsten carbide, which is preferably spherical with an exactly known radius as to all parts which are capable of making contact with the faces of the cutter. The radius of such contact member is necessarily small enough to permit entrance of the member to a considerable distance within the tooth spaces of the cutter, but large enough to insure making contact with the embracing teeth at points outside of the base circle. Such contact member is represented in Figs. 6 and 7 as a sphere. It is shown in four positions in these figures, designated, respectively, F', F², F³ and F⁴. In the positions F' and F², its center is in the plane A—A and it makes contact with the side faces of cutter teeth T and T' and the outer face of tooth T', respectively; and in the positions F³ and F⁴, its center is in the plane B—B and it engages the side faces and end face, respectively. The distances of the contact member from the axis of the cutter are measures of the outside diameter of the cutter, the diameter of an interior circle and the spacing between teeth, in various planes; and the radial differences between corresponding positions of the contact member in different planes are measures of the clearance and face angles of the cutter. The machine is provided with means for ascertaining the locations of specific planes, such as A—A and B—B of any test piece, and means for measuring distances of the contact member from the axis of the test piece in all such planes.

It may be noted here that in practice the ends of spur type cutter teeth are generally ground with a top rake so that their end faces lie in a conical surface which diverges by a small angle from planes perpendicular to the axis, but such divergence does not impair the accuracy of the cutter. Neither is it of any moment in the tests and measurements made by the use of this instrument, for in making such tests, the contact member need not be brought into engagement with the cutter teeth on the edges thereof, but may be engaged only with the surfaces of the teeth at points more or less removed from the edges. Also in testing cutters made with helical teeth, the ends of which are usually normal to the tooth helices, corresponding engagement of the contact member is made at points removed from the cutting edges. In the testing of spur and helical gears, the contact member can be engaged with the sides and outer extremities of the teeth at any points along their length.

The machine combination by which the measurements before described are carried out includes a base 1 of rigid construction which may be placed on a bench or any other convenient support, or may be provided with legs of its own. The base supports on its upper surface a head stock 2 for holding the cutter to be tested, or other test piece, and a carriage support 3. The head stock is provided with a rib 4 on its under side which occupies a longitudinal guideway 5 in the base, and has a clamp 6 adapted to be set up by a nut 7 to crowd the clamp tightly against the inclined side of the guideway and secure the head stock in any position along the length of the base. Similarly the carriage support 3 is provided at its under side with ribs 8 and 9 occupying guideways 10 and 11 in the base, and with clamps 12 and 13 for securing the support in any position lengthwise of the base.

A sleeve or spindle 14 is mounted rotatably in bearings 15 and 16 in the head stock and contains a coaxial socket in which an arbor 17 for supporting the test piece is contained. It also carries a screw 18 rotatable by a hand wheel 19 and engageable with a tapped axial hole 20 in the arbor for securing the arbor in place.

The arbor 17 is formed with a collar or flange 21 which abuts against the outer end of the sleeve spindle 14 and serves as a means to limit entrance of the arbor into the spindle, as a gauge for setting the contact member to a datum point, and as an abutment against which any test piece, such as the cutter C, is placed and held for testing. A filler sleeve 22, washer 23 and nut 24, screwed on the reduced extremity of the arbor, are shown in Fig. 1 as means for clamping the test piece against the flange 21.

A carriage 25 is mounted on the carriage support 3, being supported by two series of balls, 26 and 27, the former of which lie in a groove in the upper side of a ball guide 28, secured to the support 3 at one side thereof, while the balls 27 are confined by a ball retainer 29 on the upper surface of the support 3 near the opposite side thereof from the guide 28. Both the ball guide and ball retainer are parallel to the guideways or keyways 5, 10 and 11. Parallel grooves are formed in the under side of the carriage 25 to receive and rest on the balls.

A cross slide 30 is mounted on the carriage 25, having a key or rib 31 which occupies a guideway 32 in the upper side of the carriage and having also a clamp 33 operable by a nut 34 for securing the slide at any desired point along the guideway. The rib 31 carries a rack 311 having teeth on its under side, as appears in Fig. 4. A pinion 35 meshes with the rack and is mounted on a shaft 36 which is rotatably mounted in the carriage and protrudes therefrom into an open space, carrying a knob 37 on its protruding end.

The contact element, heretofore identified by the reference letter F, is carried by the cross slide 30. It is shown in the structural drawings as a spherical knob on the extremity of a tapered shank 38. The butt end 38a of this shank is contained in a socket in one end of a shaft 39, being secured removably therein by a set screw 40. This shaft is movable endwise in antifriction bearings 41 and 42 mounted in the carriage in alinement parallel with the guideway 32 and otherwise so located that the center of the contact member F is at the same distance from the top surface of the base as the axis of the work spindle 14. In other words, the relationship between the test piece holder or spindle, the slide 30 and the shaft 39 is such that the contact member can be moved toward and away from the work spindle and both the slide 30 and the shaft 39 are so guided that the center of the contact member is constrained to move in a path radial to the work spindle.

Movements may be imparted to the shaft 39 independently of the slide 30 by means of a hand lever 43 which is secured to a shaft 44 rotatable in the slide and carrying a pinion 45 in mesh with the rack teeth 46 cut in the under side of the shaft. Rotation of the shaft is prevented by a key member 47 secured to the upper side of the shaft which protrudes through an opening in the top wall of the slide and is confined in a keyway 48 on the inside of a cover 49 which is secured to the slide so as to overlie the opening referred to. A spring 50 reacts between the shaft 39 and a cover 51, secured to the slide across the outer end of the passage in which the shaft is contained, and urges the contact member toward the work spindle, taking up backlash between the rack teeth 46 and pinion 45. Limits of movement of the shaft in both directions are established by an adjustable stop screw 52 in the cover 51 and an adjustable screw 53 carried by the key member 47 and disposed to abut against a shoulder 54 on the slide. The shaft 39 can be secured in any position between its limits of movement by a set screw 55 mounted in a part of the slide 30 and arranged to bear against the side of key member 47.

An indicator 56 is mounted on the top of slide 30 for measuring movements of the shaft 39. It has a dial in its upper part and a hand or pointer 57 (Fig. 1) rotatable over the dial. A plunger 58 protrudes from one side of the indicator casing and is movable endwise, being coupled with the staff of hand 47 through intermediate mechanism capable of imparting motion with a large factor of multiplication to the hand from a short movement of the plunger. This indicator is one of a known type commonly used with measuring instruments and needs no description in detail. In its association with the shaft 39 and slide 30 and with a gauge 59 mounted on the spindle 14, it serves to measure movements of the contact element F radially of the spindle and distances from the axis of the spindle.

Gauge 59 is provided with a number of gauging surfaces 59a, 59b and 59c coaxial with the spindle 14 and at different, exactly determined, distances from the axis of the spindle. The several gauging surfaces are the outer boundaries of different sectors centered on the spindle and the gauge can be turned so that any one of said surfaces is interposed between the spindle axis and the extremity of the contact member. A locking screw 60 is carried by the gauge and is capable of being entered into any one of a number of sockets 61 in the head stock structure, said sockets being spaced correspondingly to the angular spacing of the several gauging surfaces, whereby the locking pin may secure the gauge with any of said faces directed toward the contact member. By movement of the carriage 25, the contact member can be located where its path of movement radially of the spindle intersects any of the gauging surfaces.

Correspondingly the carriage can be moved to bring the contact member in position to be advanced against the circumference of the flange 21. This circumference is at a definite known distance from the axis. The differences between the radial distances of this circumference and the surfaces 59a, 59b and 59c are preferably all equal, and in any event each difference is within the scope of movement of the indicator 56. For example, if the indicator is so designed that a complete rotation of its hand measures a movement of one inch by the contact member, then the several surfaces are one inch apart in radial distance from the axis of the spindle 14 and the work piece; but of course all can be established in accordance with any other selected units of measurement. The gage 59 and the flange 21 are thus used in connection with the indicator for measuring purposes, the flange 21 and each of the faces 59a, 59b and 59c of the gage representing a definite whole number of units in the measuring scale, while the change in the needle position of the indicator between that when the contact member engages such a gaging face (which position for ease in measuring may be adjusted to zero) and when the contact member engages the specimen, represents an additional fraction of a measuring unit to be added to the unit number represented by that particular gaging face. By adjusting the indicator to zero when the contact member engages the gaging face this difference in indicator reading may be read directly on the indicator. Thus, for example, should a gaging face representing two inches be in operative position, and while in engagement with this face the indicator be adjusted to read zero, and with the indicator so adjusted, the contact member be then brought into contact with the speciment whereupon the indicator needle reads .256, the radial distance of the contact point on the specimen from the axis of the specimen will then be known to be 2.256".

For measuring displacements of the contact member in the axial direction (lengthwise) of the test piece, an andicator 62 similar to the indicator 56, is mounted on an indicator carrier 63 which rests on the carriage support 3 independently of the carriage 25 and is capable of being clamped in different positions thereon along a line parallel to the path of movement of carriage 25. It is provided with a headed clamp screw 64, the head of which occupies an undercut groove 65 in the carriage support, and the shank of which passes through the indicator carrier 63 and is fitted with a clamp nut 66. Indicator 62 is connected with carrier 63 by a bracket 67. It is provided with a plunger 68 for actuating its hand or pointer, and is so located that the plunger projects toward a stud 69, mounted on carriage 25, and is in the path of movement of said stud.

An adjustable stop screw 70 is mounted in lugs 71 of the carrier 63 and its extremity projects toward a surface 72 of carriage 25 which serves as an abutment cooperating with the screw 70 to limit the movement of the carriage in one direction. A weight 73 is connected with the carriage by a cord 74 which extends in the line of movement of the carriage over a guide pulley 75 mounted on the support 3 so that the weight 73 hangs freely therefrom. The weight therefore tends to bring and hold the abutment surface 72 of the carriage against the end of stop screw 70.

In using this machine to make checks and measurements of the type previously described, the contact member and indicators are correlated with the surface 76 of the flange 21, against which one end face of the test piece is held in position for testing, and with one or another of the radial gauge elements.

Correlation with the surface 76 is made, when the test piece is removed from the arbor, by bringing one side of the contact member F against the surface 76 and adjusting the carrier 63 and stop screw 70 so that the extremity of stop screw 70 is against the carriage abutment surface 72 and the plunger 68 of indicator 62 is in contact with stud 69. Preferably the adjustment is made such that the reading of the indicator hand and dial designates the radius of the spherical curvature of the contact member in order that, when the carriage is retracted until the indicator shows zero reading, the center of the contact member will be in the plane of the surface 76, and therefore in the same plane with that end of the test piece which is held against surface 76 when the test is made. This particular setting of the indicator is, however, not essential. It is convenient for ease and certainty of measurement that the reading of the datum point be zero; but any other setting of the indicator may be taken as the starting point provided it is duly noted. Necessarily also, when this adjustment is made, the stop screw 70 is advanced from the boundary of carrier 63 far enough to permit movement of the carriage 25, pursuant to retraction of the screw, as far as needed to locate the contact member in all the planes where measurements are to be made.

It may be noted in passing that the drawings of the machine herewith furnished do not show the contact members and indicators in any setting for operation. They merely show the movable parts in random positions.

Correlation of the contact member with radial distances from the axis of the spindle is made by placing the arcuate gauge surface of which the radius is nearest to that of the maximum radius of the test piece, while being shorter than that radius, so that it faces toward the carriage 25, bringing the extremity of the contact member against the gauge surface, and adjusting the slide 30 and indicator to bring the indicator hand to the zero point of the dial, or such other graduation as may be selected as the datum position. When the contact member is being so correlated, the carriage 25 may be held stationary in the proper position by a clamp nut 160 which cooperates with a clamp, like clamp 64 previously described, and the walls of the undercut channel 65.

The test piece is mounted on the arbor, carriage 25 is allowed to advance until the indicator shows that the center of the contact member is in one of the planes (as A—A or B—B, Fig. 7), selected for measurement; the contact member is advanced into the space between two teeth of the test piece until it makes contact with said teeth and the reading of indicator 56 is noted. With the carriage 25 remaining in the same position, the contact member is retracted, the test piece rotated until the extremity of a tooth is in line with the contact member, said member is brought into contact with the extremity of the tooth and indicator 56 is read again. Then the carriage is moved to place the center of the contact member in another reference plane, established by indicator 62, and the measurements previously made are repeated and noted. This procedure is repeated in as many planes as may be needed for making complete tests of a given piece.

Alternatively, the contact member may be engaged with the test piece, either between two teeth or at the extremity of any tooth, near one end of the piece, and the carriage 25 moved to traverse the contact member toward the other end of the piece. Movements of the contact member due to taper or other variations in radius of the test piece in the axial direction are then shown by indicator 56.

Different contact members may be substituted for one another in the end socket of shaft 39. The various contact members have terminal knobs of different diameters to accord with test pieces of different diametral pitches. For use with gears and gear cutters, the appropriate contact members should engage the embracing teeth, when entered into a tooth space, at points more or less near to those at which the teeth of a meshing gear would engage the teeth of the test piece in a given plane of reference.

For testing some types of gears having shaft extensions, an adapter having a socket to receive the extension may be substituted for the arbor 17; and for other types of gear which are associated with shaft extensions or other gear elements protruding too far from the head stock to be supported in exact axial alinement by the head stock alone, a tail stock can be mounted on the base in engagement with the guideway 5 and provided with a suitable tail stock center.

I claim:

1. In a measuring apparatus of the character described, a supporting structure, a headstock mounted on said supporting structure, a spindle in said headstock on which work pieces may be mounted, a carriage on said supporting structure mounted for movement substantially parallel to the axis of said spindle, indicating means showing the amount of said movement, a slide on said carriage mounted for movement transverse to the movement of said carriage, a holder mounted to reciprocate in said slide, reciprocating means for said holder, indicating means showing the amount of said reciprocation, and a contact member fixed to said holder and adapted to engage a work piece mounted on said spindle.

2. In a measuring apparatus of the character described, a supporting structure, a headstock mounted on said supporting structure, a spindle in said headstock on which work pieces may be mounted, a carriage on said supporting structure mounted for movement substantially parallel to the axis of said spindle, a slide on said carriage mounted for movement transverse to the movement of said carriage, a stop means on said support to limit the movement of said carriage, means urging said carriage against said stop means, a holder mounted to reciprocate in said slide, and a contact member fixed to said holder and adapted to engage a work piece mounted on said spindle.

3. In a measuring apparatus of the character described, a supporting structure, a headstock mounted on said supporting structure, a spindle in said headstock on which work pieces may be mounted, a carriage on said supporting structure mounted for movement substantially parallel to the axis of said spindle, a slide on said carriage mounted for movement transverse to the movement of said carriage, a stop means on said support to limit the movement of said carriage, means urging said carriage against said stop means, a gage means mounted on said spindle and a second gage mounted on said slide, a holder mounted to reciprocate in said slide, and a contact member fixed to said holder and adapted to cooperate with said first-mentioned gage means to show the distance of said contact member from the axis of said spindle in whole units of measure and to cooperate with said second gage means to show partial units of measure from the axis of said spindle.

4. In a measuring apparatus of the character described, a supporting structure, a headstock mounted on said supporting structure, a spindle in said headstock on which work pieces may be mounted, a carriage on said supporting structure mounted for movement substantially parallel to the axis of said spindle, a slide on said carriage mounted for movement transverse to the movement of said carriage, a stop means on said support to limit the movement of said carriage, means urging said carriage against said stop means, a gage means rotatably mounted on said spindle having faces at different radial distances from the spindle axis, and a second gage mounted on said slide, a holder mounted to reciprocate in said slide, and a contact member fixed to said holder and adapted to cooperate with said first-mentioned gage means to show the distance of said contact member from the axis of said spindle in whole units of measure and to cooperate with said second gage means to show partial units of measure from the axis of said spindle.

NEAL L. COBB.

References Cited in the file of this patent

UNITED STATES PATENTS

| Number | Name | Date |
|---|---|---|
| 624,535 | Powell | May 9, 1899 |
| 804,793 | Chard et al. | Nov. 14, 1905 |
| 1,363,799 | Logue | Dec. 28, 1920 |
| 1,961,925 | Drader | June 5, 1934 |
| 2,026,784 | Hansen | Jan. 7, 1936 |
| 2,053,810 | Bisel | Sept. 8, 1936 |
| 2,295,206 | Fraunmann | Sept. 8, 1942 |
| 2,359,018 | Balk | Sept. 26, 1944 |
| 2,376,458 | Statia, Sr. | May 22, 1945 |
| 2,563,000 | Bean | Aug. 7, 1951 |

FOREIGN PATENTS

| Number | Country | Date |
|---|---|---|
| 102,652 | Great Britain | Dec. 21, 1916 |
| 185,774 | Great Britain | Sept. 11, 1922 |
| 191,965 | Great Britain | Jan. 25, 1923 |
| 664,311 | Germany | Aug. 30, 1938 |
| 866,409 | France | Aug. 12, 1941 |